United States Patent
Palanki et al.

(10) Patent No.: US 9,986,529 B2
(45) Date of Patent: May 29, 2018

(54) METHODS AND APPARATUSES FOR USE IN DETERMINING AN ALTITUDE OF A MOBILE DEVICE

(71) Applicant: QUALCOMM Incorporated, San Diego, CA (US)

(72) Inventors: Ravi Palanki, Cupertino, CA (US); Faraz Mohammad Mirzaei, San Jose, CA (US); Saumitra Mohan Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/078,319

(22) Filed: Nov. 12, 2013

(65) Prior Publication Data

US 2015/0133145 A1    May 14, 2015

(51) Int. Cl.
    *G01C 25/00*      (2006.01)
    *G01C 5/06*      (2006.01)
    *H04W 64/00*      (2009.01)
    *G01S 5/02*      (2010.01)
    *G01C 21/20*      (2006.01)
    *H04W 4/02*      (2018.01)

(52) U.S. Cl.
    CPC ............ *H04W 64/006* (2013.01); *G01C 5/06* (2013.01); *G01C 21/206* (2013.01); *G01C 25/00* (2013.01); *G01S 5/0257* (2013.01); *H04W 4/025* (2013.01); *G01S 5/0263* (2013.01)

(58) Field of Classification Search
    CPC .......... H04J 3/22; H04W 16/00; H04W 40/00
    See application file for complete search history.

(56) References Cited

U.S. PATENT DOCUMENTS

| | | |
|---|---|---|
| 6,518,918 B1 | 2/2003 | Vannucci et al. |
| 7,233,843 B2 | 6/2007 | Budhraja et al. |
| 7,672,232 B2 | 3/2010 | Ayyagari et al. |
| 7,783,729 B1 | 8/2010 | Macaluso |

(Continued)

FOREIGN PATENT DOCUMENTS

| | | |
|---|---|---|
| TW | 201331552 A | 8/2013 |
| WO | WO-2013101005 A1 | 7/2013 |
| WO | WO-2014176464 A1 | 10/2014 |

OTHER PUBLICATIONS

Partial International Search Report—PCT/US2014/064451—ISA/EPO—dated Feb. 19, 2015.

(Continued)

*Primary Examiner* — Frantz Bataille
(74) *Attorney, Agent, or Firm* — Thien T. Nguyen

(57) ABSTRACT

Various methods, apparatuses and articles of manufacture are provided which may be used in determining an altitude of a mobile device. For example, an electronic device may select a subset of reporting mobile devices located within a particular environment, estimate a reference parameter that is indicative, at least in part, of a reference altitude within the particular region, e.g., based, at least in part, on one or more altitude measurements for one or more of the reporting mobile devices, and initiate transmission of the reference parameter to at least a target mobile device. In another example, a mobile device may obtain such a reference parameter, and estimate its altitude based, at least in part, on the reference parameter.

25 Claims, 6 Drawing Sheets

(56) References Cited

U.S. PATENT DOCUMENTS

| | | | |
|---|---|---|---|
| 8,060,259 B2 | 11/2011 | Budhraja et al. | |
| 8,306,676 B1* | 11/2012 | Ingvalson | G01C 5/06 244/180 |
| 8,401,710 B2 | 3/2013 | Budhraja et al. | |
| 2007/0123223 A1* | 5/2007 | Letourneau et al. | 455/414.1 |
| 2007/0258485 A1* | 11/2007 | Kappi | G01S 19/07 370/468 |
| 2008/0132213 A1 | 6/2008 | Rittman et al. | |
| 2008/0289415 A1* | 11/2008 | Savolainen | G01C 5/06 73/384 |
| 2009/0286556 A1 | 11/2009 | Yumoto et al. | |
| 2010/0323657 A1 | 12/2010 | Barnard et al. | |
| 2012/0013475 A1 | 1/2012 | Farley et al. | |
| 2012/0039212 A1* | 2/2012 | Kaliyaperumal | H04W 88/16 370/254 |
| 2012/0072110 A1* | 3/2012 | Venkatraman | G01C 5/06 701/434 |
| 2012/0182180 A1* | 7/2012 | Wolf | G01S 5/021 342/357.29 |
| 2012/0253674 A1 | 10/2012 | Kamiwada | |
| 2013/0045759 A1 | 2/2013 | Smith | |
| 2014/0114567 A1* | 4/2014 | Buchanan | G01C 21/005 701/454 |
| 2014/0114624 A1* | 4/2014 | Buchanan | G01W 1/02 703/2 |
| 2014/0135040 A1* | 5/2014 | Edge | H04W 4/028 455/456.6 |
| 2016/0123740 A1 | 5/2016 | Poornachandran et al. | |

OTHER PUBLICATIONS

International Search Report and Written Opinion—PCT/US2014/064451—ISA/EPO—dated Jun. 29, 2015.

* cited by examiner

METHODS AND APPARATUSES FOR USE IN DETERMINING AN ALTITUDE OF A MOBILE DEVICE

BACKGROUND

1. Field

The subject matter disclosed herein relates to electronic devices, and more particularly to methods, apparatuses and articles of manufacture for use by one or more electronic devices in determining a reference parameter that is indicative, at least in part, of a reference altitude within a particular region based, at least in part, on an altitude measurement for one or more selected reporting mobile devices, wherein an altitude and/or other like height position of at least a target mobile device may be determined based, at least in part, on the reference parameter.

2. Information

As its name implies, a mobile device may be moved about, e.g. typically being carried by a user and/or possibly a machine. By way of some non-limiting examples, a mobile device may take the form of a cellular telephone, a smart phone, a tablet computer, a laptop computer, a wearable computer, a navigation and/or tracking device, etc.

A position and/or movements of a mobile device may be determined, at least in part, by a positioning and/or navigation capability (herein after simply referred to as a positioning capability) that may be implemented on board the mobile device, in one or more other electronic devices, and/or some combination thereof. Certain positioning capabilities may be based on one or more wireless signals transmitted by one or more transmitting devices and acquired by mobile device. By way of example, certain wireless signal-based positioning capabilities make use of wireless signals acquired from a satellite positioning system (SPS), such as, e.g., the global positioning system (GPS), etc.

In another example, certain wireless signal-based positioning capabilities make use of wireless signals acquired from terrestrial-based wireless transmitting devices, such as, e.g., a dedicated positioning Beacon transmitting device, an access point (AP) device which may be part of a wireless local area network, a base transceiver station which may be part of the cellular telephone system, and/or the like or some combination thereof. In certain implementations, a positioning capability may make use of one or more electronic files, such as, e.g., an electronic map, a routability graph, a radio heatmap, and/or the like or some combination thereof, to determine a position and/or other movements of the mobile device within a particular environment.

SUMMARY

In accordance with one aspect, a method may be implemented at a computing platform, which comprises: selecting a subset of reporting mobile devices from a plurality of reporting mobile devices located within a particular environment based, at least in part, on a characteristic of a target mobile device having an estimated location within a particular region of the particular environment; determining a reference parameter that is indicative, at least in part, of a reference altitude within the particular region based, at least in part, on an altitude measurement for each of the reporting mobile devices in the subset of reporting mobile devices; and transmitting the reference parameter to the target mobile device.

In accordance with one aspect, an electronic device may be provided, which comprises: a communication interface capable of sending electronic messages to and receiving electronic messages from various mobile devices; and a processing unit coupled to the communication interface and configured to: select a subset of reporting mobile devices from a plurality of reporting mobile devices located within a particular environment based, at least in part, on a characteristic of a target mobile device having an estimated location within a particular region of the particular environment; determine a reference parameter that is indicative, at least in part, of a reference altitude within the particular region based, at least in part, on an altitude measurement for each of the reporting mobile devices in the subset of reporting mobile devices; and initiate transmission of the reference parameter to the target mobile device via the communication interface.

In accordance with one aspect, an electronic device may be provided, which comprises: means for selecting a subset of reporting mobile devices from a plurality of reporting mobile devices located within a particular environment based, at least in part, on a characteristic of a target mobile device having an estimated location within a particular region of the particular environment; means for determining a reference parameter that is indicative, at least in part, of a reference altitude within the particular region based, at least in part, on an altitude measurement for each of the reporting mobile devices in the subset of reporting mobile devices; and means for transmitting the reference parameter to the target mobile device via the communication interface.

In accordance with one aspect, an article of manufacture may be provided which comprises a non-transitory computer readable medium having stored therein computer implementable instructions executable by a processing unit of a computing platform to: select a subset of reporting mobile devices from a plurality of reporting mobile devices located within a particular environment based, at least in part, on a characteristic of a target mobile device having an estimated location within a particular region of the particular environment; determine a reference parameter that is indicative, at least in part, of a reference altitude within the particular region based, at least in part, on an altitude measurement for each of the reporting mobile devices in the subset of reporting mobile devices; and initiate transmission of the reference parameter to the target mobile device.

In accordance with one aspect, a method may be implemented at a mobile device, which comprises: obtaining a reference parameter that is indicative, at least in part, of a reference altitude within a particular region of a particular environment, the expected reference parameter having been determined based, at least in part, on an altitude measurement for each of a subset of reporting mobile devices, the subset of reporting mobile devices having been selected from a plurality of reporting mobile devices within the particular environment based, at least in part, on a characteristic of the mobile device, and wherein an estimated location of the mobile device is within the particular region; and estimating an altitude of the mobile device based, at least in part, on the reference parameter.

In accordance with one aspect, a mobile device may be provided, which comprises: a communication interface capable of sending electronic messages to and receiving electronic messages from various electronic devices; and a processing unit coupled to the communication interface and configured to: obtain, via the communication interface, a reference parameter that is indicative, at least in part, of a reference altitude within a particular region of a particular environment, the expected reference parameter having been determined based, at least in part, on an altitude measurement for each of a subset of reporting mobile devices, the subset of reporting mobile devices having been selected from a plurality of reporting mobile devices within the particular environment based, at least in part, on a characteristic of the mobile device, and wherein an estimated location of the mobile device is within the particular region; and estimate an altitude of the mobile device based, at least in part, on the reference parameter.

In accordance with one aspect, an apparatus may be provided for use in a mobile device, which comprises: means for obtaining a reference parameter that is indicative, at least in part, of a reference altitude within a particular region of a particular environment, the expected reference parameter having been determined based, at least in part, on an altitude measurement for each of a subset of reporting mobile devices, the subset of reporting mobile devices having been selected from a plurality of reporting mobile devices within the particular environment based, at least in part, on a characteristic of the mobile device, and wherein an estimated location of the mobile device is within the particular region; and means for estimating an altitude of the mobile device based, at least in part, on the reference parameter.

In accordance with one aspect, an article of manufacture may be provided which comprises a non-transitory computer readable medium having stored therein computer implementable instructions executable by a processing unit of a mobile device to: obtain a reference parameter that is indicative, at least in part, of a reference altitude within a particular region of a particular environment, the expected reference parameter having been determined based, at least in part, on an altitude measurement for each of a subset of reporting mobile devices, the subset of reporting mobile devices having been selected from a plurality of reporting mobile devices within the particular environment based, at least in part, on a characteristic of the mobile device, and wherein an estimated location of the mobile device is within the particular region; and estimate an altitude of the mobile device based, at least in part, on the reference parameter.

In accordance with one aspect, a method may be implemented at a computing platform, which comprises: selecting a subset of reporting mobile devices from a plurality of reporting mobile devices located within a particular environment based, at least in part, on a characteristic of a target mobile device having an estimated location within a particular region of the particular environment; determining a reference parameter comprising an expected barometric pressure for a reference altitude within the particular region based, at least in part, on a reported barometric pressure measurement and a corresponding altitude for at least one of the reporting mobile devices in the subset of reporting mobile devices; and transmitting the expected barometric pressure to the target mobile device.

In accordance with one aspect, an apparatus may be provided which comprised: means for selecting a subset of reporting mobile devices from a plurality of reporting mobile devices located within a particular environment based, at least in part, on a characteristic of a target mobile device having an estimated location within a particular region of the particular environment; means for determining a reference parameter comprising an expected barometric pressure for a reference altitude within the particular region based, at least in part, on a reported barometric pressure measurement and a corresponding altitude for at least one of the reporting mobile devices in the subset of reporting mobile devices; and means for transmitting the expected barometric pressure to the target mobile device.

In accordance with one aspect, an electronic device may be provided which comprises: a communication interface capable of sending electronic messages to and receiving electronic messages from various mobile devices; and a processing unit coupled to the communication interface and configured to: select a subset of reporting mobile devices from a plurality of reporting mobile devices located within a particular environment based, at least in part, on a characteristic of a target mobile device having an estimated location within a particular region of the particular environment; determine a reference parameter comprising an expected barometric pressure for a reference altitude within the particular region based, at least in part, on a reported barometric pressure measurement and a corresponding altitude for at least one of the reporting mobile devices in the subset of reporting mobile devices; and initiate transmission of the expected barometric pressure to the target mobile device via the communication interface.

In accordance with one aspect, an article of manufacture may be provided which comprises a non-transitory computer readable medium having stored therein computer implementable instructions executable by a processing unit of a computing platform to: select a subset of reporting mobile devices from a plurality of reporting mobile devices located within a particular environment based, at least in part, on a characteristic of a target mobile device having an estimated location within a particular region of the particular environment; determine a reference parameter comprising an expected barometric pressure for a reference altitude within the particular region based, at least in part, on a reported barometric pressure measurement and a corresponding altitude for at least one of the reporting mobile devices in the subset of reporting mobile devices; and initiate transmission of the expected barometric pressure to the target mobile device.

In accordance with one aspect, a method may be implemented at a mobile device, which comprises: obtaining a reference parameter comprising an expected barometric pressure for a reference altitude within a particular region of a particular environment, the expected barometric pressure having been estimated based, at least in part, on an altitude measurement comprising a reported barometric pressure measurement and a corresponding altitude for at least one of a subset of reporting mobile devices, the subset of reporting mobile devices having been selected from a plurality of reporting mobile devices within the particular environment based, at least in part, on a characteristic of the mobile device, and wherein an estimated location of the mobile device is within the particular region; determining a local barometric pressure based on a local barometric pressure measurement; and estimating an altitude of the mobile device based, at least in part, on the reference barometric pressure and the local barometric pressure.

In accordance with one aspect, an apparatus may be provided which comprises: means for obtaining a reference parameter comprising an expected barometric pressure for a reference altitude within a particular region of a particular environment, the expected barometric pressure having been estimated based, at least in part, on an altitude measurement comprising a reported barometric pressure measurement and a corresponding altitude for at least one of a subset of reporting mobile devices, the subset of reporting mobile devices having been selected from a plurality of reporting mobile devices within the particular environment based, at least in part, on a characteristic of the mobile device, and wherein an estimated location of the mobile device is within the particular region; means for determining a local barometric pressure based on a local barometric pressure measurement; and means for estimating an altitude of the mobile device based, at least in part, on the reference barometric pressure and the local barometric pressure.

In accordance with one aspect, a mobile device may be provided which comprises: a communication interface capable of sending electronic messages to and receiving electronic messages from various electronic devices; and a processing unit coupled to the communication interface and configured to: obtain, via the communication interface, a reference parameter comprising an expected barometric pressure for a reference altitude within a particular region of a particular environment, the expected barometric pressure having been estimated based, at least in part, on an altitude measurement comprising a reported barometric pressure measurement and a corresponding altitude for at least one of a subset of reporting mobile devices, the subset of reporting mobile devices having been selected from a plurality of reporting mobile devices within the particular environment based, at least in part, on a characteristic of the mobile device, and wherein an estimated location of the mobile device is within the particular region; determine a local barometric pressure based on a local barometric pressure measurement; and estimate an altitude of the mobile device based, at least in part, on the reference barometric pressure and the local barometric pressure.

In accordance with one aspect, an article of manufacture may be provided which comprises a non-transitory computer readable medium having stored therein computer implementable instructions executable by a processing unit of a computing platform to: obtain a reference parameter comprising an expected barometric pressure for a reference altitude within a particular region of a particular environment, the expected barometric pressure having been estimated based, at least in part, on an altitude measurement comprising a reported barometric pressure measurement and a corresponding altitude for at least one of a subset of reporting mobile devices, the subset of reporting mobile devices having been selected from a plurality of reporting mobile devices within the particular environment based, at least in part, on a characteristic of the mobile device, and wherein an estimated location of the mobile device is within the particular region; determine a local barometric pressure based on a local barometric pressure measurement; and estimate an altitude of the mobile device based, at least in part, on the reference barometric pressure and the local barometric pressure.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
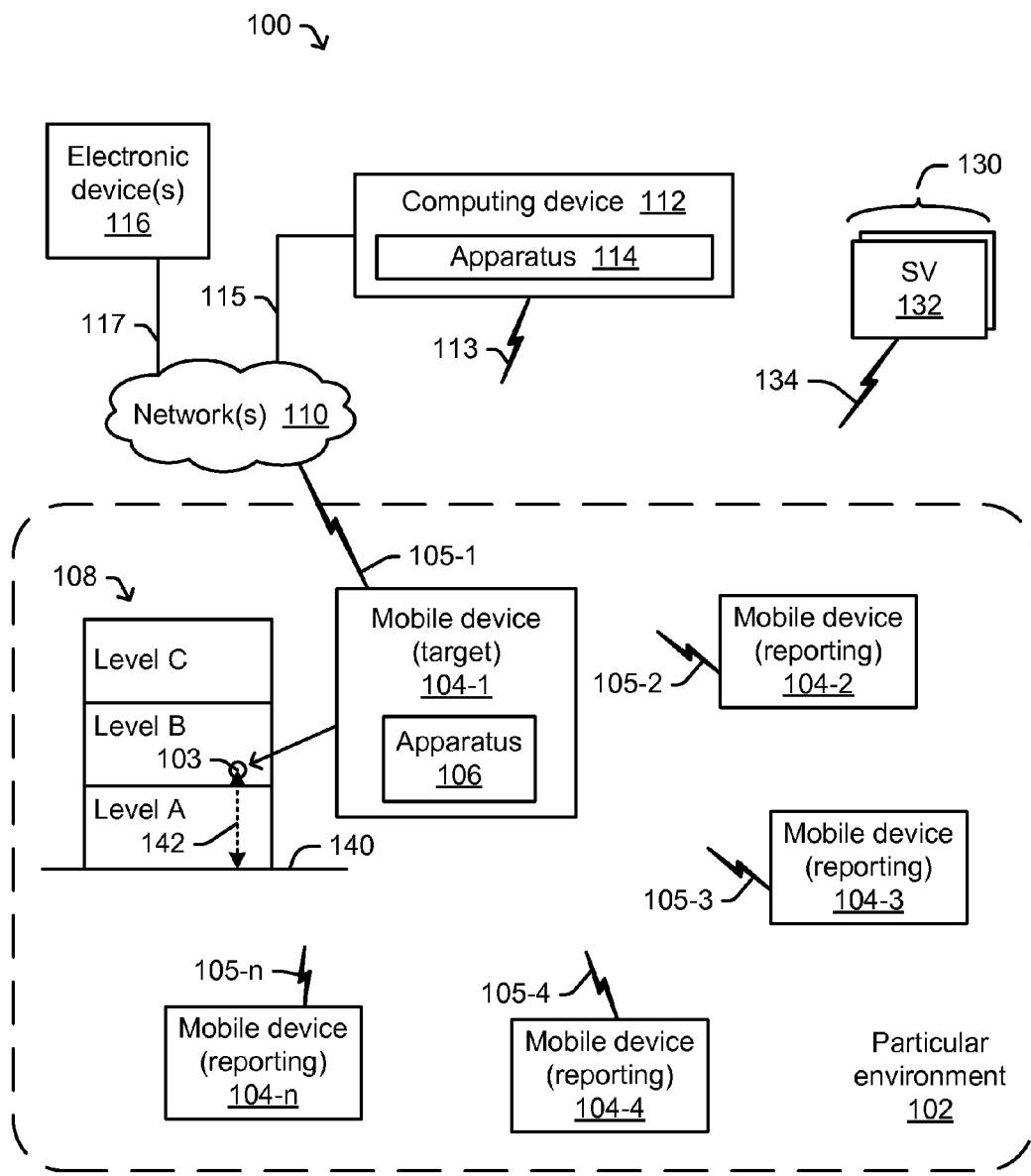
FIG. 1 is a schematic block diagram illustrating an arrangement of representative electronic devices including one or more electronic devices for use in determining a reference parameter that is indicative, at least in part, of a reference altitude within a particular region based, at least in part, on an altitude measurement for one or more selected reporting mobile devices, and wherein an altitude and/or other like height position of at least a target mobile device may be determined based, at least in part, on the expected barometric pressure, in accordance with an example implementation.

Mobile devices, such as cellphones, personal digital assistants, etc., may be configured to receive location based services through the use of location determination technology including Satellite Positioning System (SPS), indoor location determination technologies and/or the like. In particular implementations, a mobile device may be provided with positioning assistance data to enable the mobile device to estimate its location using one or more positioning techniques or technologies.

In particular implementations of indoor navigation applications, it may be useful to determine an altitude of a mobile device. This may be particularly useful in navigating multi-level structures in which a mobile device may be provided with navigation assistance data such as locations of transmitters, radio heatmaps, digital maps for display, routing maps, etc. As navigation assistance data for navigating an entire multi-story building may be voluminous, a mobile device may only be provided with localized navigation assistance data depending, for example, on the general location of the mobile device (e.g., particular floor or wing of a building). In particular implementation, a mobile device may be determined to be located on a particular level of a structure using one or more positioning techniques. A mobile device may then be provided with navigation assistance data for use on that particular floor (e.g., including locations of transmitters located on the floor, a digital map for display to assist in navigating the floor, etc.).

In a particular implementation, a mobile device may resolve its location as being a particular floor of a structure by acquiring signals transmitted by transmitters positioned at known locations. Here, a mobile device may acquire a MAC address or other information modulating a signal transmitted by a transmitter (e.g., IEEE std. 802.11 access point) in range of the mobile device to infer that the mobile device is relatively close to the transmitter located on a particular building floor or region thereof. This technique, however, may be unreliable if a particular access point or transmitter transmits a signal that may be acquired by a mobile device on any one of multiple floors of the building. For example, this may lead to a determined floor of a mobile device to oscillate or "ping-pong" between adjacent floors of a building.

In another particular implementation, mobile device may resolve its location as being on a particular floor of a building by obtaining barometric pressure measurements at a built-in barometric pressure sensor. In practice, however, computing an altitude of a mobile device from barometric pressure measurements may pose a problem because the mobile device may not by itself determine the current atmospheric pressure (e.g., at sea level, or other reference datum) which may vary, e.g., depending on local weather conditions, etc. Unless a reference barometric pressure is provided to the mobile device by some external source, the mobile device may not be able to use atmospheric pressure measurements to determine its absolute altitude (or building floor, etc.).

Various techniques are described herein which may be implemented using one or more electronic devices to determine a reference parameter that is indicative, at least in part, of a reference altitude within a particular region based, at least in part, on an altitude measurement for one or more selected reporting mobile devices. Various techniques are also described herein which may be implemented using one or more electronic devices to determine an altitude and/or other like height position of at least a target mobile device based, at least in part, on such a reference parameter.

In certain example implementations, a reference parameter may comprise or otherwise be indicative, at least in part, of an expected barometric pressure for a reference altitude within a particular region.

In certain example implementations, a reference parameter may comprise or otherwise be indicative, at least in part, of an estimated altitude of a target mobile device and/or a particular region.

In certain example implementations, an altitude measurement for at least one of the selected reporting devices may comprise or otherwise be indicative, at least in part, of a reported barometric pressure measurement from and/or an estimated altitude corresponding to the selected reporting device and/or a particular region.

For example, in certain implementations, a method may be implemented in whole or in-part, in one or more computing platforms to select a subset of reporting mobile devices from a plurality of reporting mobile devices located within a particular environment based, at least in part, on a characteristic of a target mobile device. The target mobile device may, for example, have an estimated location within a particular region of the particular environment. For example, in certain instances a target mobile device may have an estimated location within an indoor environment formed, at least in part, by a structure (e.g., a building, and/or the like), which may be surrounded/within the particular environment (e.g., an outdoor or other like environment having an atmospheric pressure that changes with altitude).

As described in greater detail herein, one or more characteristics of a target mobile device may be taken into consideration in selecting a subset of reporting mobile devices. For example, a characteristic of a target mobile device may be indicative of one or more a position fix parameter (e.g., map coordinates, ranges, etc.) corresponding to an estimated location of the target device. As another example, a characteristic of a target mobile device may be indicative of a make and/or model of a target mobile device.

In certain instances, a characteristic of a target mobile device may be indicative of a service and/or subscription feature corresponding to a target mobile device. In yet another example, a characteristic of a target mobile device may be indicative of a barometric sensor capability of a target mobile device.

Furthermore, as described in greater detail herein, various factors corresponding to a given reporting mobile device may be taken into consideration in selecting reporting mobile devices to be in the subset of reporting mobile devices. For example, in certain implementations, one or more position fix parameters for a reporting mobile device may be considered. For example, a make and/or a model of a reporting mobile device may be considered. In certain implementations, a service and/or subscription feature corresponding to a reporting mobile device may be taken into consideration. In yet another example, a barometric sensor capability of a reporting mobile device may be considered.

In still other example implementations, one or more measurements obtained from one or more sensors, e.g., inertial sensors (accelerometers, gyroscopes, etc.) of a reporting mobile device may be considered. In certain instances, one or more confidence level indicators (e.g., corresponding to a reported barometric pressure measurement and/or an altitude) for a reporting mobile device may be taken into consideration in selecting reporting mobile devices for a subset of mobile devices. In yet another example, one or more age indicators (e.g., timestamp, life span, remaining time, etc.) corresponding to a reported barometric pressure measurement and/or an altitude for a reporting mobile device may be considered.

Continuing with the earlier example, in certain implementations, a method may be further implemented in whole or in-part, in one or more computing platforms to determine a reference parameter (e.g., estimate an expected barometric pressure, estimate an altitude, etc.) that is indicative, at least in part, of a reference altitude (e.g., within the particular region) based, at least in part, on one or more altitude measurements (e.g., reported barometric pressure measurements, one or more corresponding altitudes, etc.) for one or more of the reporting mobile devices in a selected subset of reporting mobile devices. By way of example, in certain implementations, an expected barometric pressure for a reference altitude within a particular region may be estimated, at least in part, by combining and/or otherwise taking into consideration the reported barometric pressure measurements. For example, in certain implementations a reference parameter may be determined, at least in part, by applying various statistical, interpolation, extraction, modeling, and/or other like known techniques to the applicable reported barometric pressure measurements and/or altitudes.

In certain implementations, in estimating an expected barometric pressure for a reference altitude, a reported barometric pressure measurement and/or a corresponding altitude for at least one of the reporting mobile devices in a selected subset may be weighted differently than another reported barometric pressure measurement and/or the corresponding altitude for at least one other of the reporting mobile devices in the subset.

In certain implementations, a computing platform may obtain a corresponding altitude for a reporting mobile device. For example, a reporting mobile device may be able to determine its altitude based, at least in part, on acquired SPS signals (e.g., GPS signals), user input(s), etc.

In some example implementations, a computing platform may determine a corresponding altitude for at least one of reporting mobile device in a subset of reporting mobile devices. For example, in certain instances a corresponding altitude may be determined based, at least in part, on a geographic contour parameter of an electronic map and/or the like corresponding to at least a portion of the particular environment. Hence, given a position fix or other like parameter(s) for a reporting mobile device, a corresponding altitude may be determined (e.g., using known techniques) based on elevation and/or other like height parameters for a corresponding position/location in an electronic map.

In certain example implementations, a reference parameter may be transmitted to a target mobile device.

As such, in accordance with certain example implementations a method may be implemented at a (target) mobile device to obtain a reference parameter (e.g., an expected barometric pressure), and estimate an altitude of the mobile device based, at least in part, on the reference parameter. For example, a reference parameter may comprise a reference barometric pressure and an altitude of the mobile device may be estimated, at least in part, on the reference parameter and a local barometric pressure may be determined based on a local barometric pressure measurement. For example, a reference parameter may comprise a reference altitude, a level indicator, and/or the like, and an altitude of the mobile device may be estimated, at least in part, on the reference parameter.

As described in greater detail herein, in certain instances an estimated location of a mobile device may indicate that the mobile device may be within an indoor environment of a structure located within the particular environment. In an example, a structure may comprise a plurality of levels (e.g., floors) having different altitudes and the method may further comprise selecting a mode of transition from one of the plurality of levels to another one of plurality of levels based, at least in part, on an estimated altitude. For example, a mode of transition may be selected from a staircase mode, an escalator mode, or an elevator mode. In certain example implementations, the method may further comprise identifying two or more candidate destinations of the mode of transition based, at least in part, on the selected mode, and selecting from among the candidate destinations based on one or more subsequent local barometric pressure measurements. In an example implementation, the method may further comprise limiting (e.g., in a positioning function) at least one other possible destination of the mode of transition based, at least in part, on a selected mode of transition. In certain example implementations, such methods may comprise associating a position of the mobile device within the indoor environment as being on a particular one of the plurality of levels based, at least in part, on the estimated altitude.

Attention is now drawn to FIG. 1, which is a schematic block diagram illustrating an example arrangement 100 comprising various example electronic devices, one or more of which may be configured for use in determining a reference parameter that is indicative, at least in part, of a reference altitude within a particular region of particular environment 102. In certain instances, a particular region of particular environment 102 may actually comprise an indoor environment within a structure 108. In this example, structure 108 is illustrated as having a plurality of different levels (Level A, Level B and Level C) extending upward in altitude above a represented surface level 140. Accordingly, level A may represent a ground level floor, level B may represent a middle floor and level C may represent a top floor, e.g., of a three story building. Of course, claimed subject matter is not intended to be so limited. It is assumed in the examples provided herein, that the atmospheric pressure within such "indoor" environments or structure(s) may be essentially the same or substantially similar as the atmospheric pressure in the surrounding/adjacent particular environment 102 and may vary based on altitude in the same or substantially similar manner.

In certain instances, it may also be possible for an indoor environment to have a different pressure than its surrounding environment. Those skilled in the art should recognize that some of the techniques provided herein may or may not be applicable, however, to region(s) having artificially controlled atmospheric pressure(s). For example, some of the techniques may be adapted to provide a reference parameter comprising an expected barometric pressure for a region within a covered stadium or other like structure in which an internal pressure is artificially controlled (e.g., to maintain a pliable fabric cover/ceiling, etc.). For example, a reporting mobile device may also be located within such a region and hence provide a barometric pressure measurement indicative of the artificially controlled atmospheric pressure. However, only a single altitude determination may be available based on barometric pressure measurements within such an artificially controlled atmospheric pressure region.

A mobile device 104-1 may represent a target mobile device, e.g., for which an altitude may be desirable. For example, an altitude may be used to determine which of the levels of structure 108 target mobile device 104-1 may be located within or on. As used herein the term "altitude" is intended to broadly represent a distance measurement from some particular point or level. Thus, in certain examples, an altitude may be indicative of a height or elevation (e.g., measured in units of meters, feet, etc.) above a referenced point (e.g., earth-center), or a plane or a curve (e.g., corresponding to a referenced sea level, a ground level/elevation, etc.). In certain instances, an altitude may be associated with one or more specific parameters indicative of a location/position using a particular coordinate system. Thus, in certain instances, an altitude may be representative of a z-axis in a three dimensional coordinate system. In certain instances, an altitude may represent an offset measured from another (e.g., reference) altitude.

Hence, as used herein the term "reference altitude" may be indicative of a distance or height/depth from a reference datum (e.g., a point, plane, curve, etc.). For example, a reference datum may correspond to a mean sea level, a distance from some modeled earth-center point, etc., e.g., depending upon the applicable coordinate system. Hence, in certain implementations, represented surface level 140 as illustrated in FIG. 1 may correspond to a particular reference datum directly, or indirectly (e.g., as some offset distance therefrom).

As such, if mobile device 104-1 is located at a position 103 within level B of structure 108, then a distance represented dashed-line 142 may represent an altitude (in whole or in part) of mobile device 104-1. For example, represented surface level 140 may correspond to reference datum (e.g., mean sea level, etc.) and an altitude at position 103 may correspond to a geographic elevation of five meters above the reference datum. In another example, represented surface level 140 may correspond to a nominal (local) elevation of a city that is at average of one thousand meters above a mean sea level, and hence the altitude of position 103 may be indicated as including the one thousand meters plus an additional five meters, or possibly just the off set of five meters. It should be kept in mind, however, that a reference altitude may correspond to any selected reference altitude for which barometric pressure(s) may be determined (e.g., measured, estimated).

In addition to mobile device 104-1 (a target mobile device), are a plurality of "reporting" mobile devices, labeled as mobile devices 104-2 through 104-*n*, each of which is located within particular environment 102. Mobile device 104-1 is illustrated as having a capability of transmitting and receiving electronic messages over a communication link 105-1. Similarly, mobile devices 104-2 through 104-*n* may transmit and receive electronic messages over respective communication links 105-2 through 105-*n*. As such, mobile devices 104-1 through 104-*n* may communicate with one another and/or various electronic devices via network(s) 110. In certain instances, two or more mobile devices may communication directly with one another possibly without using network(s) 110.

Computing device 112 may be representative of one or more computing platforms provisioned in one or more electronic devices. As described herein, various techniques may be implemented via computing device 112 and/or an apparatus 114 provisioned therein which may be used in determining a reference parameter (e.g., an expected barometric pressure, etc.) that is indicative, at least in part, of a reference altitude within a particular region based, at least in part, on an altitude measurement (e.g., reported barometric pressure measurements and corresponding altitudes, etc.) for one or more selected reporting mobile devices 104-2 through 104-*n*. As mentioned, an altitude of at least target mobile device 104-1 may be determined based, at least in part, on the reference parameter. For example, an apparatus 106 may be provisioned in mobile device 104-1 to determine an altitude of mobile device 104-1 based, at least in part, on an expected barometric pressure. Hence, in certain implementations, apparatus 106 may request an expected barometric pressure from apparatus 114, e.g., by transmitting one or more messages over communication link 105-1, network(s) 110, and communication link 115. Apparatus 106 may, for example, respond to such a request (and/or at some other instance act) by transmitting one or more messages indicative of a reference parameter to apparatus 106, e.g., over communication link 115, network(s) 110, and communication link 105-1.

As previously mentioned, one or more characteristics of (target) mobile device 104-2 may be taken into consideration by apparatus 104-1 in selecting a subset of (reporting) mobile devices from plurality of reporting mobile devices 104-2 through 104-*n*. Accordingly, in certain example implementations, one or more such characteristics may be provided in whole or part by mobile device 104-2 and/or one or more other electronic device(s) 116 to apparatus 114. In certain example implementations, one or more such characteristics may be determined in whole or part by apparatus 114.

Apparatus 114 may further request and/or receive one or more electronic messages indicative of one or more altitude measurements for one or more selected reporting mobile devices 104-2 through 104-*n* via network(s) 110 and communication link 115, and respective communication links 105-2 through 105-*n*. For example, a corresponding altitude may be determined by a reporting mobile device based, at least in part, on acquiring one or more SPS signals 134. As previously mentioned, in certain implementations a corresponding altitude for a reported barometric pressure measurements may be determined by one or more other electronic devices, e.g., by apparatus 114. For example, wireless location signaling information (e.g., SPS, terrestrial, or some combination thereof) obtained by a reporting mobile device may be provided to apparatus 114 for use in determining a corresponding altitude.

In FIG. 1, mobile devices 104-1 through 104-*n* may be representative of any electronic devices capable of being moved in some manner at least within particular environment 102. In some instances, two or more of these mobile devices may be of the same or different types. Although designated in FIG. 1 as functioning as target or reporting mobile devices, it should be understood that some mobile devices may function as a target device at one point in time and a reporting mobile device at another point in time.

By way of example, mobile device 104-2, which is shown as a reporting mobile device in FIG. 1, may at some other point in time function as a target mobile device. For example, if mobile device 104-2 were to be moved (e.g., by a person or machine) to another region (e.g., possibly to an inside environment) where it may be unable to reliably determine its altitude (e.g., due to a lack of acquired SPS signals) and/or where for some reason it may desire to calibrate an on-board barometric capability, etc. Consequently, mobile device 104-2 (which may include an apparatus the same or similar to apparatus 106) may become a target mobile device and receive a reference parameter (e.g., an expected barometric pressure, etc.) using techniques as provided herein.

In another example, target mobile device 104-1 may, in certain instances, subsequently perform as a reporting mobile device, e.g., via apparatus 106. For example, mobile device 104-1 may at some point be able to reliably determine its altitude (likely, in addition to other position fix parameters), e.g., through acquired signals (e.g., acquired SPS signals, Bluetooth, etc.), user input(s), and/or the like or some combination thereof just to name a few examples.

In some example implementations, however, a particular mobile device may only be configured to function as a target mobile device or a reporting mobile device with respect to the techniques provided herein. Of course, in certain instances other mobile devices may be located within particular environment 102 which may not participate in any of the techniques provided herein.

As mentioned, apparatus 114 may select a subset of reporting mobile devices within particular environment 102 based on various factors. In certain instances, such a subset may comprise one or more reporting mobile devices. In certain other instances, such a subset may comprise two or more reporting devices.

By way of example, a mobile device may, for example, comprise a cellular telephone, a smart phone, a tablet computer, a laptop computer, a wearable computer, etc.

As illustrated in mobile device 104-1, a mobile device may comprise an apparatus 106, which may be configured to provide and/or support in some manner one or more of the techniques provided herein. In certain instances, apparatus 106 may comprise hardware/firmware components, or possibly a combination of hardware/firmware and software components.

Although certain communication links are illustrated in FIG. 1 as being either wireless communication links or wired communication links, it should be kept in mind that some communication links may comprise wired and/or wireless communication links, and/or even other intervening and/or supporting devices, etc. For example, in some implementations communication links 115 and/or 117 may comprise wireless communication links, etc. In certain example implementations, computing device 112 may be capable of directly communicating with one or more other devices via communication link 113.

Computing device 112, which may be located within, nearby, or remotely from particular environment 102, may comprise an apparatus 114, which may be configured to provide and/or support in some manner one or more of the techniques provided herein. In certain instances, apparatus 114 may comprise hardware/firmware components, or possibly a combination of hardware/firmware and software components.

Network(s) 110 is intended to represent all or part of one or more other electronic devices and/or communication facilities and/or resources capable of supporting wired and/or wireless electronic communication. Thus for example, network(s) 110 may comprise all or part of a telephone network, a cellular telephone network, a wireless communication network, an intranet, the Internet, and/or the like or some combination thereof.

As further illustrated, in certain implementations arrangement 100 may comprise one or more space positioning systems (SPS) 130, which may transmit applicable wireless signals that may, at times, be acquired by various electronic devices (e.g., mobile devices) and used, at least in part, to support a positioning function under certain conditions. A positioning function may, for example, determine one or more position/location parameters, and/or otherwise support certain navigation capabilities (e.g., based on routing, course prediction, speed, velocity, trajectory, electronic maps, routing graphs, etc.) Here, for example, SPS 130 may comprise a plurality of space vehicles (SVs) 132, each of which may transmit one or more SPS signals 134.

In certain example implementations, a mobile device may estimate its position/location (e.g., obtain a position fix or portions thereof) by measuring ranges to a plurality of terrestrial-based transmitting devices (e.g., provisioned as part of or supporting network(s) 110, etc.). Such ranges may be measured, for example, by obtaining a MAC ID address and/or the like from wireless signals received from such transmitting devices and obtaining range measurements to the transmitting devices by measuring one or more characteristics of wireless signals received therefrom, such as, e.g., a received signal strength (RSSI), a round trip time (RTT), an angle of arrival (AOA), and/or the like or some combination thereof.

In certain implementations, mobile device may obtain an indoor position fix by applying characteristics of acquired wireless signals to a radio heatmap, which may indicate expected RSSI and/or RTT signatures at particular locations in an environment 102 or portion(s) thereof. In particular implementations, a radio heatmap may associate identities of certain transmitting devices, expected RSSI from wireless signals transmitted by the identified transmitting devices, an expected RTT from the identified transmitting devices, and possibly standard deviations from these expected RSSI or RTT. It should be understood, however, that these are merely examples of values that may be stored in a radio heatmap and/or the like which may be provided via some form of assistance data, and that claimed subject matter is not limited in this respect.

In certain example implementations, a mobile device may receive some assistance data for positioning purposes from one or more electronic devices. For example, some assistance data may include one or more radio heatmaps, locations and identities of transmitting devices positioned at known or determinable locations to enable measuring ranges to these transmitting devices based, at least in part, on a measured RSSI and/or RTT, for example. Other assistance data to aid positioning operations may include radio locations and identities of transmitters, routeability graphs, just to name a few examples. Other assistance data received by the mobile device may include, for example, one or more electronic maps of all or part of environment 102, some of which may be rendered and or otherwise presented via a display device and/or possibly other input/output device, e.g., to aid in navigation, etc. In certain instances, all or part of an electronic map may be provided to a mobile device while approaching and/or upon entering a particular portion of environment 102 (e.g., structure 108). In certain instances, an electronic map may be indicative of various features such as doors, hallways, entry ways, walls, etc., points of interest such as bathrooms, pay phones, room names, stores, etc. By obtaining and possibly displaying such map information, a mobile device may overlay its estimated location and possibly an uncertainty seceded there with for a user to view, and possibly interact with as part of a positioning operation.

In an example implementation, a routeability graph and/or the like may assist a mobile device in defining feasible areas for navigation within environment 102, e.g., subject to physical obstructions (e.g., walls) and passage ways (e.g., doorways in walls). Here, by defining feasible areas for navigation, a mobile device may apply constraints to aid in the application of filtering measurements for estimating locations and/or motion trajectories according to a motion model (e.g., according to a particle filter and/or Kalman filter). In addition to measurements obtained from the acquisition of wireless signals from various transmitting devices, according to a particular embodiment, a mobile device may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a position/location or motion state.

Figure 2A:
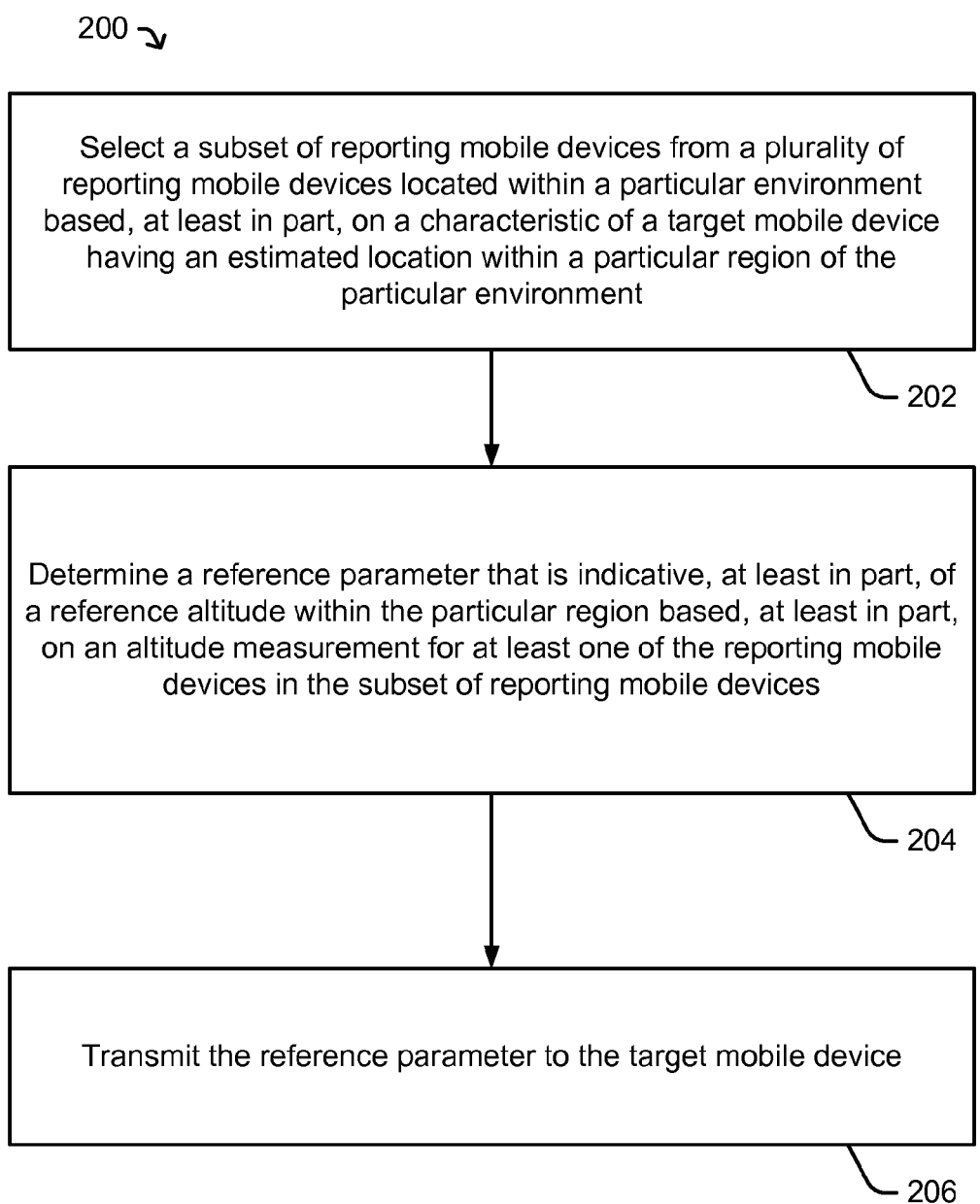
FIG. 2A and FIG. 2B are flow diagrams illustrating some example processes that may be implemented in one or more electronic devices to a reference parameter that is indicative, at least in part, of a reference altitude within a particular region based, at least in part, on an altitude measurement for one or more selected reporting mobile devices, in accordance with certain example implementations.

Attention is drawn next to FIG. 2A, which is a flow diagram illustrating an example process 200 that may be implemented in one or more electronic devices to determine a reference parameter that is indicative, at least in part, of a reference altitude within a particular region based, at least in part, on an altitude measurement one or more selected reporting mobile devices, in accordance with certain example implementations. By way of example, in certain instances, process 200 may be implemented in computing device 112 and/or apparatus 114.

At example block 202, a subset of reporting mobile devices may be selected from a plurality of reporting mobile devices located within a particular environment based, at least in part, on a characteristic of a target mobile device having an estimated location within a particular region of the outdoor environment. At example block 204, a reference parameter that is indicative, at least in part, of for a reference altitude within the particular region may be determined based, at least in part, on an altitude measurement for at least one of the reporting mobile devices in the subset of reporting mobile devices. At example block 206, a reference parameter may be transmitted to the target mobile device.

Figure 2B:
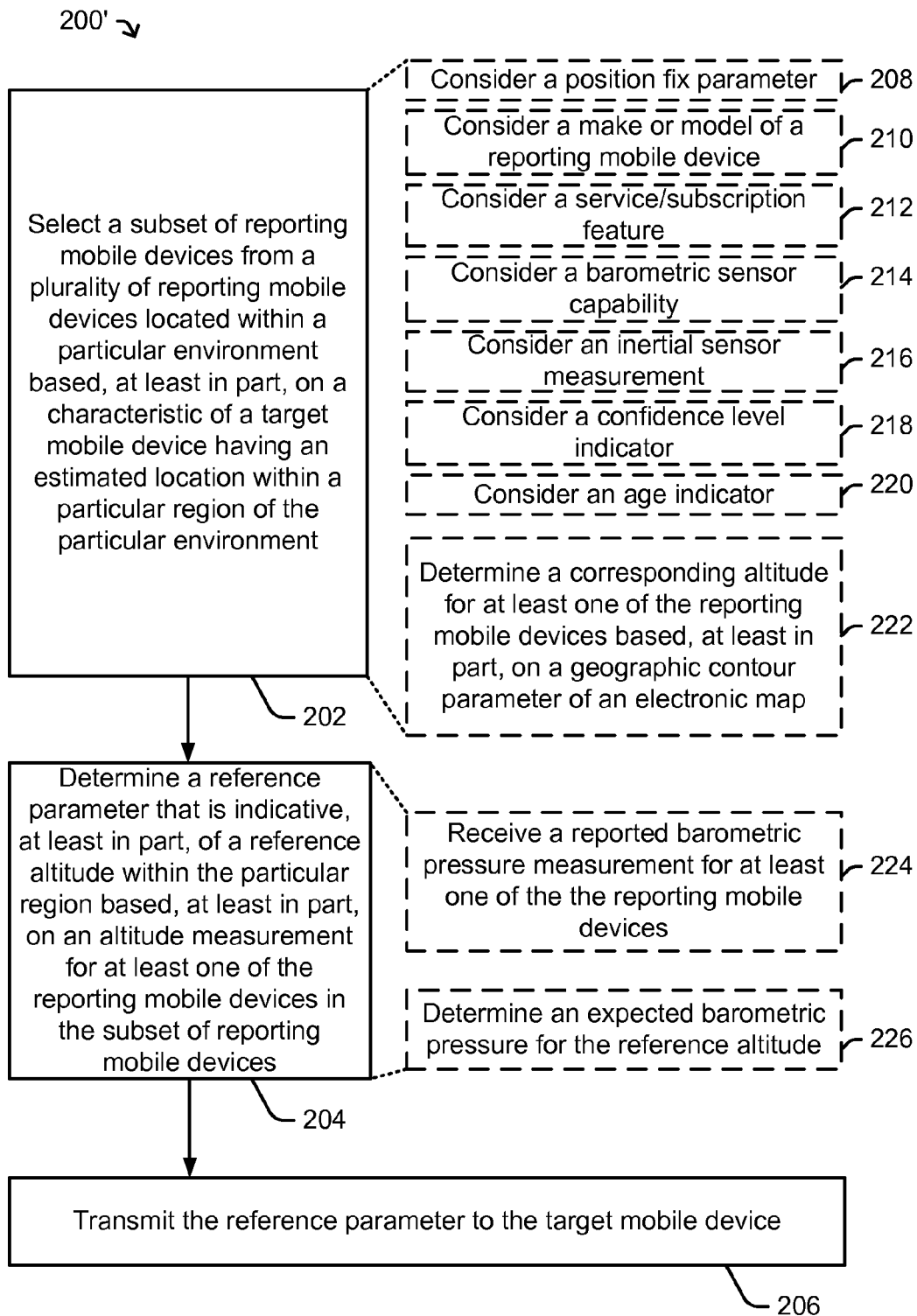

Attention is drawn next to FIG. 2B, which is a flow diagram illustrating an example process 200' that may be implemented in one or more electronic devices, in accordance with certain example implementations. By way of example, in certain instances, process 200' may be implemented in computing device 112 and/or apparatus 114.

Example process 200' comprises example blocks 202, 204 and 206 as previously described and illustrated in FIG. 2A. As shown, example block 202 in which a subset of reporting mobile devices may be selected, may further comprise one or more of example blocks 208, 210, 212, 214, 216, 218, 220, and/or 222.

At example block 208, a position fix parameter for at least one reporting mobile device may be considered in selecting a subset of reporting mobile devices. For example, a position fix parameter may be indicative, in whole or in part, of a latitude, a longitude, and/or an altitude, and/or other like coordinate parameters corresponding to a position/location of a reporting device. For example, in certain instances, a reporting device may be included or excluded from a subset based, at least in part, on whether it satisfies a position fix parameter desire (e.g., requirement, threshold, etc.). Such a position fix parameter may, for example, be obtained directly or indirectly from a reporting mobile device and/or some other electronic device.

At example block 210, a make or model (or other like identifying information) corresponding to at least one reporting mobile device may be considered in selecting a subset of reporting mobile devices. For example, a make or model identifier of a reporting mobile device may be considered since such identifying information may infer certain positioning capabilities or limitations regarding its usefulness, reliability, accuracy, etc., in supporting certain techniques as provided herein (e.g., obtaining position fix parameters, barometric measurements, etc.), and/or other functions, such as, communication capabilities, and/or the like. For example, in certain instances, a reporting device may be included or excluded from a subset based, at least in part, on whether it satisfies a make or model desire (e.g., requirement, threshold, etc.). Such a make or model identifier may, for example, be obtained directly or indirectly from a reporting mobile device and/or some other electronic device.

At example block 212, a service or subscription feature (or other like identifying information) corresponding to at least one reporting mobile device may be considered in selecting a subset of reporting mobile devices. For example, a service or subscription feature identifier of a reporting mobile device may be considered since such identifying information may infer certain positioning capabilities or limitations regarding its availability, usefulness, reliability, accuracy, etc., in supporting certain techniques as provided herein (e.g., obtaining position fix parameters, barometric measurements, etc.), and/or other functions, such as, communication capabilities, and/or the like. For example, in certain instances, a reporting device may be included or excluded from a subset based, at least in part, on whether it satisfies a service or subscription feature desire (e.g., requirement, threshold, etc.). Such a service or subscription feature identifier may, for example, be obtained directly or indirectly from a reporting mobile device and/or some other electronic device.

At example block 214, a barometric sensor capability of at least one reporting mobile device may be considered in selecting a subset of reporting mobile devices. For example, a barometric sensor capability identifier of a reporting mobile device may be considered since such identifying information may infer certain capabilities or limitations regarding its availability, usefulness, reliability, accuracy, etc., in supporting certain techniques as provided herein (e.g., obtaining barometric measurements). For example, in certain instances, a reporting device may be included or excluded from a subset based, at least in part, on whether it satisfies a barometric sensor capability desire (e.g., requirement, threshold, etc.). Such a barometric sensor capability identifier may, for example, be obtained directly or indirectly from a reporting mobile device and/or some other electronic device.

At example block 216, a measurement obtained from an inertial sensor of at least one reporting mobile device may be considered in selecting a subset of reporting mobile devices. For example, an inertial sensor based measurement or other like indication (e.g., motion mode, etc.) of a reporting mobile device may be considered since such movement related information may infer certain capabilities or limitations regarding its availability, usefulness, reliability, accuracy, etc., in supporting certain techniques as provided herein (e.g., obtaining position fix parameters, obtaining barometric measurements, communicating, etc.). For example, in certain instances, a reporting device may be included or excluded from a subset based, at least in part, on whether it satisfies an inertial sensor based measurement or other like indication desire (e.g., requirement, threshold, etc.). For example, an inertial sensor based measurement or other like indication may indicate that a reporting mobile device may be stationary and possibly more useful than if the reporting mobile device were moving quickly or possibly erratically in some manner which may render the reporting mobile device less useful. Such an inertial sensor based measurement or other like indication may, for example, be obtained directly or indirectly from a reporting mobile device and/or some other electronic device.

At example block 218, a confidence level indicator corresponding to a reported barometric pressure measurement and/or a corresponding altitude for at least one reporting mobile device may be considered in selecting a subset of reporting mobile devices. For example, a confidence level indicator may infer a certain usefulness, reliability, accuracy, etc. of the reported barometric pressure measurement and/or the corresponding altitude, in supporting certain techniques as provided herein (e.g., estimating an expected barometric pressure, etc.). For example, in certain instances, a reporting device may be included or excluded from a subset based, at least in part, on whether it satisfies a confidence level desire (e.g., requirement, threshold, etc.). Such a confidence level indicator may, for example, be obtained directly or indirectly from a reporting mobile device and/or some other electronic device.

At example block 220, an age indicator corresponding to a reported barometric pressure measurement and/or a corresponding altitude for at least one reporting mobile device may be considered in selecting a subset of reporting mobile devices. For example, an age indicator may infer a certain usefulness, reliability, accuracy, timeliness, etc. of the reported barometric pressure measurement and/or the corresponding altitude, in supporting certain techniques as provided herein (e.g., estimating an expected barometric pressure, etc.). For example, in certain instances, a reporting device may be included or excluded from a subset based, at least in part, on whether it satisfies an age indicator desire (e.g., requirement, threshold, etc.). Such a confidence level indicator may, for example, be obtained directly or indirectly from a reporting mobile device and/or some other electronic device.

At example block 222, an altitude for a reporting device maybe determined based, at least in part, on a geographic contour parameter of an electronic map and/or the like. Thus, for example, one or more position fix parameters and/or other like information may be obtained for a remote mobile device which may indicate that such reporting mobile device is at a particular position/location identifiable via a geographic contour parameter of an electronic map and/or the like. Hence, a corresponding altitude may be determined accordingly.

At example block 224, an altitude measurement may be received (e.g., from at least one of the reporting mobile devices) that comprises a reported barometric pressure measurement and which may be used, at least in part, to determine a reference parameter at block 204. At example block 226, an expected barometric pressure for the reference altitude may be determined, e.g., in determining a reference parameter at block 204.

Figure 3A:
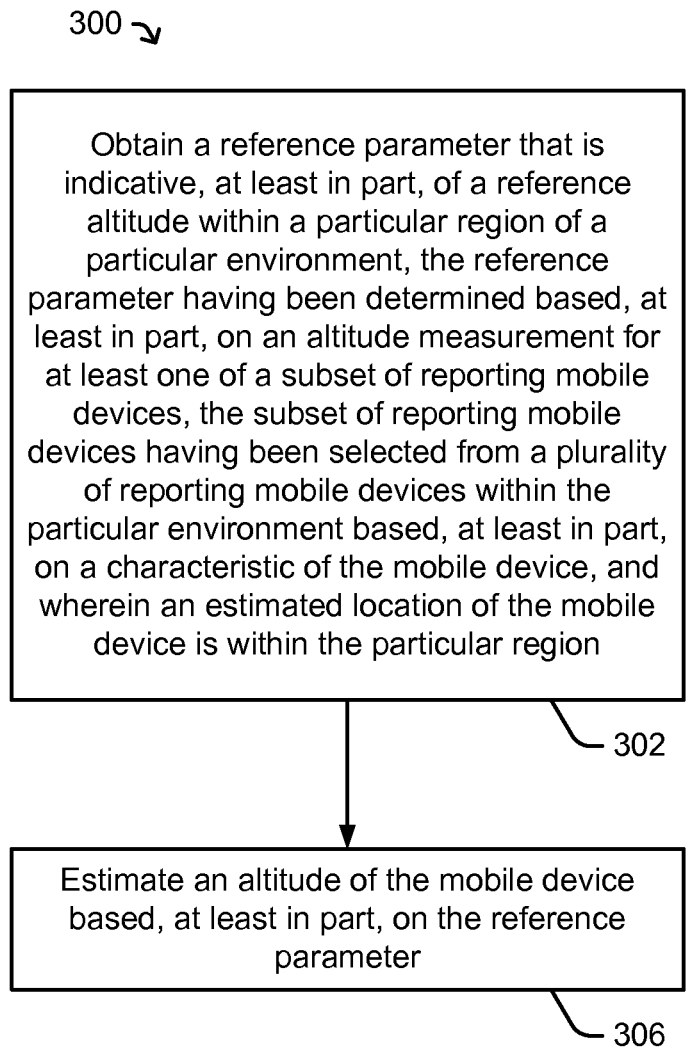
FIG. 3A and FIG. 3B are flow diagrams illustrating some example processes that may be implemented in one or more electronic devices to determine an altitude and/or other like height position of a target mobile device based, at least in part, on a reference parameter, in accordance with certain example implementations.

Attention is drawn next to FIG. 3A, which is a flow diagram illustrating an example process 300 that may be implemented in an electronic device to estimate it altitude based, at least in part, on a reference parameter that is indicative, at least in part, of a reference altitude within a particular region, in accordance with certain example implementations. By way of example, in certain instances, process 300 may be implemented in (target) mobile device 104-1 and/or apparatus 106.

At example block 302, a reference parameter that is indicative, at least in part, of a reference altitude within a particular region of an outdoor environment may be obtained from another electronic device (e.g., computing device 112 or apparatus 114). Here, for example, the reference parameter may have been estimated based, at least in part, on one or more altitude measurements for one or more of a subset of reporting mobile devices. Furthermore, the subset of reporting mobile devices may have been selected from a plurality of reporting mobile devices within the outdoor environment based, at least in part, on a characteristic of the mobile device. In certain instances, an estimated location of the mobile device (estimated locally and/or remotely) may place it within the particular region. At example block 306, an altitude of the (target) mobile device may be estimated based, at least in part, on the reference parameter.

Figure 3B:
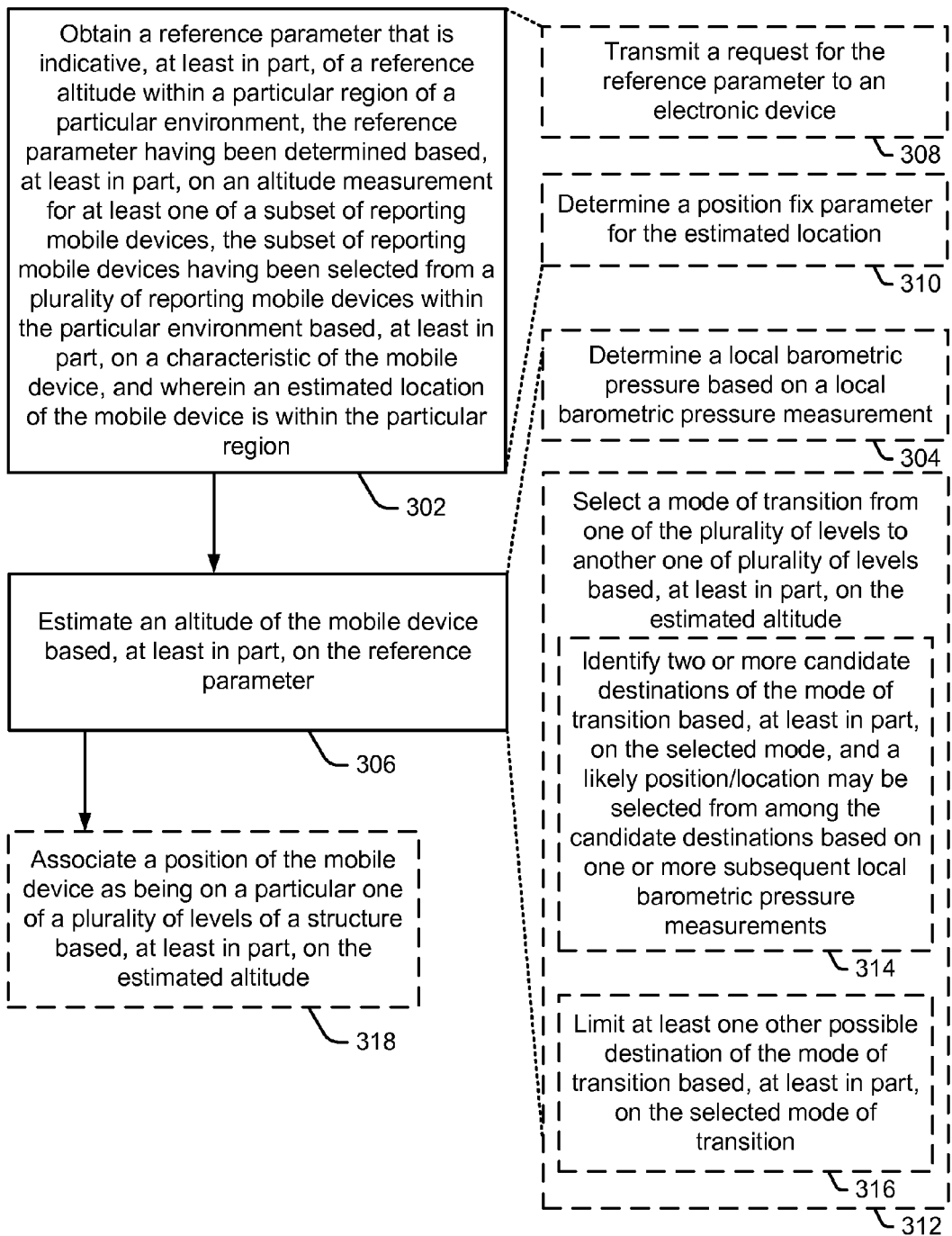

Attention is drawn next to FIG. 3B, which is a flow diagram illustrating an example process 300' that may be implemented in an electronic device, in accordance with certain example implementations. By way of example, in certain instances, process 300' may be implemented in (target) mobile device 104-1 and/or apparatus 106.

Example process 300' comprises example blocks 302, and 306 as previously described and illustrated in FIG. 3A, and in certain instances example block 318. As shown, example block 302 may further comprise, in certain instances, one or more of example blocks 308 and/or 310, and example block 306 may further comprise, in certain instances, example blocks 304 and 312. Example block 312 may comprise, in certain instances, example blocks 314 and/or 316.

At example block 308, to obtain a reference parameter, one or more requests may be transmitted to one or more other electronic devices (e.g., computing device 112). By way of example, a target mobile device may transmit a request for a reference parameter which may indicate one or more characteristics corresponding to the target mobile device. In certain implementations, a request may be indicative of the estimated location of the target mobile device and/or a particular region of the environment (e.g., based, at least in part, on one or more position fix parameters).

Hence, at example block 310, a position fix parameter for the estimated location may be determined, in whole or in part. For example, a position fix parameter may be determined based on one or more acquired signals, a last good position fix, a user input, etc. Thus, a position fix parameter may be more or less precise/accurate depending upon how or possibly when it's determined. In certain implementations, a position fix parameter may comprise signal information that is gathered at the mobile device for subsequent processing (in whole or part) by one or more other electronic devices. For example, a target mobile device may record or otherwise gather wireless signal information and forward such to another device for processing that may indicate all or part of a position fix for the target mobile device.

At example block 304, a local barometric pressure may be determined based on one or more local barometric pressure measurements. Hence, for example, an altitude of the mobile device as estimated at block 306 may be based, at least in part, on a reference parameter (as obtained at block 302) and a local barometric pressure as determined at block 304, e.g., using well known techniques.

At example block 312, in estimating an altitude of the (target) mobile device in a structure having a plurality of levels, a mode of transition may be determined or otherwise selected which may indicate how the target mobile device may be moving from one level to another level based, at least in part, on the estimated altitude (e.g., or change therein over a period of time). For example, a staircase mode of transition may indicate that the target mobile device is being moved, at least in part, by a person ascending/descending a staircase, ladder, etc. For example, an elevator mode of transition may indicate that the target mobile device is being moved, at least in part, by a person or object on an elevator, etc., affecting the altitude of the target mobile device.

At example block 314, two or more candidate destinations of the mode of transition may be identified based, at least in part, on the selected mode, and a likely position/location may be selected from among the candidate destinations based on one or more subsequent local barometric pressure measurements. Thus, for example, in certain instances example block 314 may provide support to and/or otherwise affect a positioning function/capability within the target mobile device. At example block 316, at least one other possible destination of the mode of transition may be limited or otherwise affected in some manner based, at least in part, on the selected mode of transition.

At example block 318, a position of the target mobile device may be associated with the target mobile device being on a particular one of a plurality of levels of a structure based, at least in part, on the estimated altitude. For example, in certain implementations an electronic map and/or the like may be indicative of altitudes of one or more levels, distances between two or more levels, etc., which may be considered. In certain implementations, a nominal value or range for a distance between levels of a structure may be considered.

Figure 4:
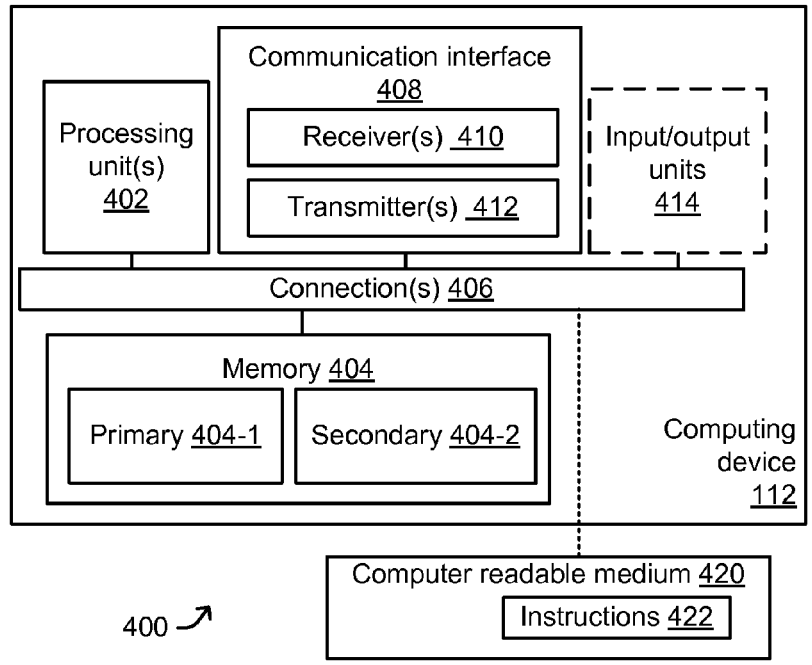
FIG. 4 is a schematic diagram illustrating certain features of an example special purpose computing platform that may be provisioned within a network-based computing device to determine a reference parameter that is indicative, at least in part, of a reference altitude within a particular region based, at least in part, on an altitude measurement for one or more selected reporting mobile devices, in accordance with certain example implementations.

FIG. 4 is a schematic diagram illustrating certain features of an example special purpose computing platform 400 that may be provisioned within a network-based computing device 112 and/or apparatus 114 (FIG. 1) according to the various techniques provided herein.

As illustrated special purpose computing platform 400 may comprise one or more processing units 402 (e.g., to perform data processing in accordance with certain techniques provided herein) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located and coupled with processing unit 402 or other like circuitry within computing device 112. Secondary memory 404-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 420. Memory 404 and/or non-transitory computer readable medium 420 may comprise instructions 422 for use in performing data processing, e.g., in accordance with the applicable techniques as provided herein.

Special purpose computing platform 400 may, for example, further comprise a communication interface 408. Communication interface 408 may, for example, comprise one or more wired and/or wireless network interface units, radios, modems, etc., represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface capability.

In accordance with certain example implementations, communication interface 408 may, for example, be enabled for use with various wired communication networks, e.g., such as telephone system, a local area network, a wide area network, a personal area network, an intranet, the Internet, etc.

In accordance with certain example implementations communication interface 408 and/or 508 (see FIG. 5) may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Computing device 112 may, for example, further comprise one or more input and/or output units 414. Input and/or output units 414 may represent one or more devices or other like mechanisms that may be used to obtain inputs from and/or provide outputs to one or more other devices and/or a user. Thus, for example, input and/or output units 414 may comprise various buttons, switches, a touch pad, a trackball, a joystick, a touch screen, a keyboard, and/or the like, which may be used to receive one or more user inputs. In certain instances, input and/or output units 414 may comprise various devices that may be used in producing a visual output, an audible output, and/or a tactile output for a user. For example, input and/or output units 414 may be used to present a video display, graphical user interface, etc., on a display mechanism.

Figure 5:
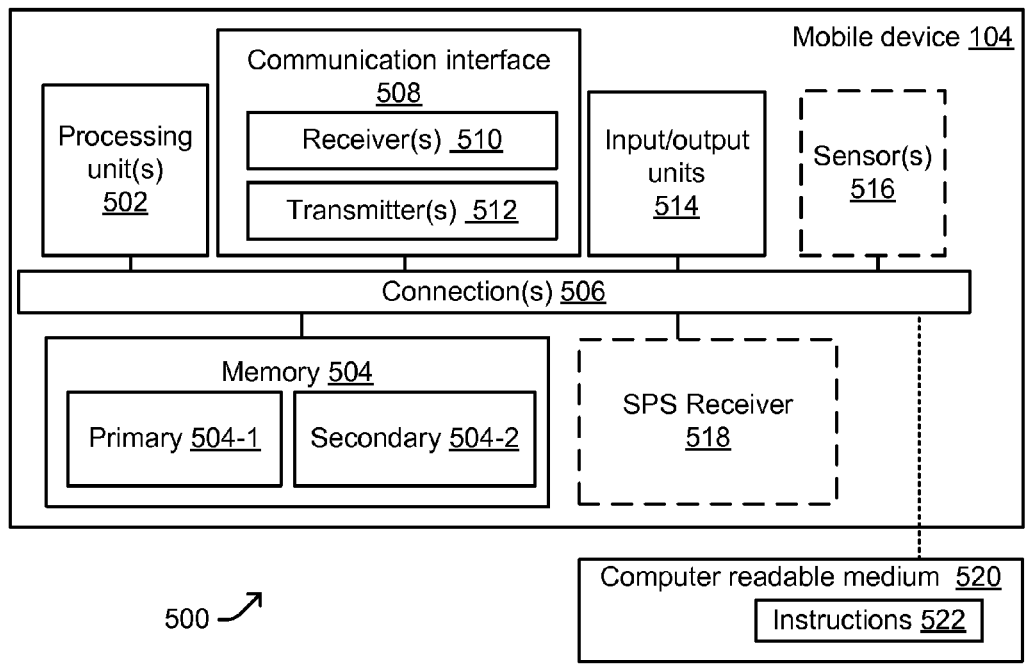
FIG. 5 is a schematic diagram illustrating certain features of an example special purpose computing platform that may be provisioned within a target mobile device to determine an altitude and/or other like height position of based, at least in part, on a reference parameter, in accordance with certain example implementations.

FIG. 5 is a schematic diagram illustrating certain features of an example special purpose computing platform 500 that may be provisioned within a mobile device (e.g., 104-1, 104-2, . . . , 104-n) and/or an applicable apparatus 106 (FIG. 1) according to the various techniques provided herein.

As illustrated special computing platform 500 may comprise one or more processing units 502 (e.g., to perform data processing in accordance with certain techniques provided herein) coupled to memory 504 via one or more connections 506 (e.g., one or more electrical conductors, one or more electrically conductive paths, one or more buses, one or more fiber-optic paths, one or more circuits, one or more buffers, one or more transmitters, one or more receivers, etc.). Processing unit(s) 502 may, for example, be implemented in hardware or a combination of hardware and software. Processing unit(s) 502 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof. Processing unit(s) 502 may, for example, perform computer implementable instructions corresponding to one or more applications(s) 152 (FIG. 1).

Memory 504 may be representative of any data storage mechanism. Memory 504 may include, for example, a primary memory 504-1 and/or a secondary memory 504-2. Primary memory 504-1 may comprise, for example, a random access memory, read only memory, etc. While illustrated in this example as being separate from the processing units, it should be understood that all or part of a primary memory may be provided within or otherwise co-located and coupled with processing unit 502 or other like circuitry within mobile device 104. Secondary memory 504-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 520. Memory 504 and/or non-transitory computer readable medium 520 may comprise instructions 522 for use in performing data processing, e.g., in accordance with the applicable techniques as provided herein.

Special purpose computing platform 500 may, for example, further comprise one or more communication interface 508. Communication interface 508 may, for example, comprise one or more wired and/or wireless network interface units, radios, modems, etc., represented here by one or more receivers 510 and one or more transmitters 512. It should be understood that in certain implementations, communication interface 508 may comprise one or more transceivers, and/or the like. Further, it should be understood that although not shown, communication interface 508 may comprise one or more antennas and/or other circuitry as may be applicable given the communication interface capability.

In accordance with certain example implementations, communication interface 508 may, for example, be enabled for use with various wired communication networks, e.g., such as telephone system, a local area network, a wide area network, a personal area network, an intranet, the Internet, etc.

Mobile device 104 may, for example, further comprise one or more input and/or output units 514. Input and/or output units 514 may represent one or more devices or other like mechanisms that may be used to obtain inputs from and/or provide outputs to one or more other devices and/or a user. Thus, for example, input and/or output units 514 may comprise various buttons, switches, a touch pad, a trackball, a joystick, a touch screen, a keyboard, a microphone, a camera, and/or the like, which may be used to receive one or more user inputs. In certain instances, input and/or output units 514 may comprise various devices that may be used in producing a visual output, an audible output, and/or a tactile output for a user. For example, input and/or output units 514 may be used to present a video display, graphical user interface, positioning and/or navigation related information, visual representations of electronic map, routing directions, etc., via a display mechanism and/or audio mechanism.

Mobile device 104 may, for example, comprise one or more sensors 516. For example, sensor(s) 516 may represent one or more environmental sensors, such as, e.g., a magnetometer or compass, a barometer or altimeter, etc., and which may be useful for positioning. For example, sensor(s) 516 may represent one or more inertial sensors, which may be useful in detecting certain movements of mobile device 104. Thus for example, sensor(s) 516 may comprise one or more accelerometers, one or one or more gyroscopes. Further, in certain instances sensor(s) 516 may comprise and/or take the form of one or more input devices such as a microphone, a camera, a light sensor, etc.

SPS receiver 518 may be capable of acquiring and acquiring wireless signals 134 via one or more antennas (not shown). SPS receiver 518 may also process, in whole or in part, acquired wireless signals 134 for estimating a position and/or a motion of mobile device 104. In certain instances, SPS receiver 518 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 104. In certain implementations, all or part of such processing of acquired SPS signals may be performed by other processing capabilities in mobile device 104, e.g., processing unit(s) 502, memory 504, etc., in conjunction with SPS receiver 518. Storage of SPS or other signals for use in performing positioning operations may be performed in memory 504 or registers (not shown).

In certain instances, sensor(s) 516 may generate analog or digital signals that may be stored in memory 504 and processed by DPS(s) (not shown) or processing unit(s) 502 in support of one or more applications such as, for example, applications directed to positioning or navigation operations based, at least in part, on one or more positioning functions.

Processing unit(s) 502 may comprise a dedicated modem processor or the like that may be capable of performing baseband processing of signals acquired and down converted at receiver(s) 510 of communication interface 508 or SPS receiver 509. Similarly, a modem processor or the like may perform baseband processing of signals to be up converted for transmission by (wireless) transmitter(s) 512. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

In particular implementations, computing device 112, apparatus 114, and other one or more electronic device(s) 116 (FIG. 1) may provide indoor navigation assistance data to cover many different indoor areas including, for example, floors of buildings, wings of hospitals, terminals at an airport, portions of a university campus, areas of a large shopping mall, just to name a few examples. Also, memory resources at a target mobile device 104-1 and data transmission resources may make receipt of indoor navigation assistance data for all areas served computing device 112, apparatus 114, and other one or more electronic device(s) 116 impractical or infeasible, a request for indoor navigation assistance data from target mobile device 104-1 may indicate a rough or course estimate (e.g., via one or more position fix parameters, etc.) of a location of target mobile device 104-1. Target mobile device 104-1 may then be provided indoor navigation assistance data covering areas including and/or proximate to the rough or course estimate of the position/location of target mobile device 104-1.

In one particular implementation, a request for indoor navigation assistance data from target mobile device 104-1 may specify a location context identifier (LCI) and/or the like. Such an LCI may be associated with a locally defined area such as, for example, a particular floor of a building or other indoor area which is not mapped according to a global coordinate system. In one example electronic device architecture, upon entry of an area, target mobile device 104-1 may request that a first electronic device provide one or more LCIS covering the area or adjacent areas. Here, the request from the target mobile device 104-1 may include a rough location of target mobile device 104-1 such that the requested electronic device may associate the rough location with areas covered by known LCIS, and then transmit those LCIS to target mobile device 104-1. Target mobile device 104-1 may then use the received LCIS in subsequent messages (possibly with a different electronic device) for obtaining navigation assistance data relevant to an area identifiable by one or more of the LCIS as discussed above (e.g., digital maps, locations and identifies of beacon transmitters, radio heatmaps or routeability graphs).

As pointed out above, in the absence of a reference atmospheric pressure (e.g., at a particular reference altitude such as sea level) computing an altitude of a target mobile device from barometric pressure measurements may pose a problem because a current atmospheric pressure at a particular altitude may vary depending on local weather conditions, etc. According to an implementation, a reference barometric pressure for use by a target mobile device in an indoor environment may be computed based, at least in part, on crowd-sourced barometric pressure measurements obtained from a selected subset of reporting mobile devices, e.g., which may have locations in a surrounding environment close or proximate to the indoor area. Here, it may be presumed that barometric pressure measurements obtained at the same altitude may not significantly vary from indoor to outdoor environments. Alternatively, it may be presumed that any differences between outdoor and indoor barometric pressure measurements obtained at the same altitude may be predictable.

In certain example implementations, barometric pressure measurements may be obtained contemporaneously with a position fix (e.g., a GPS position fix, etc.) that includes an altitude component. A barometric pressure measurement obtained in an outdoor environment at the position fix altitude may then be interpolated and/or extrapolated to an expected barometric pressure at an indoor reference altitude (e.g., altitude of a ground floor or other floor of a multi-floor building), for example. This crowd-sourcing technique may be performed centrally at one or more electronic devices to provide a computed expected barometric pressure (e.g., at the indoor reference altitude as positioning assistance data based on barometric pressure measurements paired with altitude components of contemporaneous position fixes).

In one example implementation, a target mobile device in an indoor environment may apply such a computed expected barometric pressure for a particular indoor reference altitude to barometric pressure measurements obtained at the mobile device to estimate an altitude of the mobile device (e.g., a particular building floor where the mobile device is located). In one example, a target mobile device may compute expected barometric pressure values for different floors of an indoor area based, at least in part, on an expected barometric pressure value received in assistance data, and then compare a current barometric pressure measurement with the expected barometric pressure values computed for different floors to select an altitude of the mobile device from among the altitudes of the multiple floors.

As pointed out herein, it is presumed that there is at least a loose correlation between barometric pressure measurements obtained in an indoor environment and barometric pressure measurements obtained in an outdoor environment close or proximate to the indoor environment. According to an implementation, outdoor measurements of barometric pressure paired with altitude components used for crowdsourcing may be decorrelated for different reasons. For example, data collected through crowd-sourcing may have a time stamp, and expire after some time. Also, data may be decorrelated spatially, e.g. measurements close to a target device (or particular indoor area) may be more relevant compared to those further away. Also, an uncertainty of an estimate of an altitude of a mobile device may vary from mobile device to mobile device. In short, older measurements, measurements obtained further from a target area, measurements paired with less accurate altitude components of position fixes may be given less weight in computing an expected barometric pressure for a reference altitude. In certain implementations, reporting mobile device may be included or excluded from a selected subset of reporting mobile devices based on such or similar considerations, several examples of which have been previously described.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a computing platform:
    receiving, over one or more wireless communication links, electronic messages indicative of reported barometric pressure measurements and corresponding altitude measurements from barometric sensors in a plurality of reporting mobile devices located within a particular environment;
    selecting a subset of reporting mobile devices from said plurality of reporting mobile devices located within said particular environment, said selecting said subset of reporting mobile devices being based, at least in part, on a characteristic of a target mobile device, wherein said characteristic of said target mobile device comprises a barometric sensor capability of said target mobile device, a make of said target mobile device or a model of said target mobile device, or a combination thereof;
    determining an expected barometric pressure that is indicative, at least in part, of a reference altitude within said particular environment based, at least in part, on an altitude measurement for at least one of said reporting mobile devices in said subset of reporting mobile devices; and
    transmitting said expected barometric pressure that is indicative, at least in part, of said reference altitude to said target mobile device, said expected barometric pressure indicative, at least in part, of said reference altitude to be used to obtain an estimated altitude of said target mobile device and associate a position with said target mobile device based, at least in part on said estimated altitude.

2. The method as recited in claim 1, and further comprising, at said computing platform:
    selecting said subset of reporting mobile devices in response to a request for said expected barometric pressure for said reference altitude from said target mobile device.

3. The method as recited in claim 1, and further comprising, at said computing platform:
    determining said altitude measurement for said at least one of said reporting mobile devices in said subset of reporting mobile devices based, at least in part, on a geographic contour parameter of an electronic map corresponding to said particular environment.

4. The method as recited in claim 1, and further comprising, at said computing platform:
    transmitting a request for said altitude measurement for said at least one of said reporting mobile devices in said subset of reporting mobile devices to said at least one of said reporting mobile devices in said subset of reporting mobile devices.

5. The method as recited in claim 1, and further comprising, at said computing platform:
    selecting said subset of reporting mobile devices based, at least in part, on: (1) a make or model of said reporting mobile devices; (2) a barometric sensor capability of said reporting mobile devices to obtain a measurement from an inertial sensor of said reporting mobile devices; (3) a confidence level indicator corresponding to a reported barometric pressure measurement and/or said altitude measurement for said reporting mobile devices; (4) an age indicator corresponding to said reported barometric pressure measurement and/or said altitude measurement for said reporting mobile devices; or (5) some combination of (1) through (4).

6. The method as recited in claim 1, and wherein said characteristic of said target mobile device is indicative of: a position fix parameter for an estimated location; a service or subscription feature corresponding to said target mobile device; or some combination thereof.

7. An electronic device comprising:
    a communication interface capable of sending electronic messages to and receiving electronic messages from various mobile devices; and
    a processing unit coupled to said communication interface and configured to:
    receive, at said communication interface and via one or more wireless communication links, electronic messages indicative of reported barometric pressure measurements and corresponding altitude measurements from barometric sensors a plurality of reporting mobile devices located within a particular environment;
    select a subset of reporting mobile devices from said plurality of reporting mobile devices located within said particular environment, said to select said subset of reporting mobile devices being based, at least in part, on a characteristic of a target mobile device, wherein said characteristic of said target mobile device comprises a barometric sensor capability of said target mobile device, a make of said target mobile device or a model of said target mobile device, or a combination thereof;
    determine an expected barometric pressure that is indicative, at least in part, of a reference altitude within said particular environment based, at least in part, on an altitude measurement for at least one of said reporting mobile devices in said subset of reporting mobile devices; and initiate transmission of said expected barometric pressure that is indicative, at least in part, of said reference altitude to said target mobile device via said communication interface, said expected barometric pressure that is indicative, at least in part of said reference altitude to be used to obtain an estimated altitude of said target mobile device and associate a position with said target mobile device based, at least in part on said estimated altitude.

8. The electronic device as recited in claim 7, and wherein said processing unit is further configured to:

select said subset of reporting mobile devices in response to a request for said expected barometric pressure that is indicative, at least in part, of said reference altitude received via said communication interface from said target mobile device.

9. The electronic device as recited in claim 7, and wherein said processing unit is further configured to:

determine said altitude measurement for said at least one of said reporting mobile devices in said subset of reporting mobile devices based, at least in part, on a geographic contour parameter of an electronic map corresponding to said particular environment.

10. The electronic device as recited in claim 7, and wherein said processing unit is further configured to:

initiate transmission of a request for said altitude measurement for said at least one of said reporting mobile devices in said subset of reporting mobile devices to said at least one of said reporting mobile devices in said subset of said reporting mobile devices, via said communication interface.

11. The electronic device as recited in claim 7, and wherein said processing unit is further configured to:

select said subset of reporting mobile devices from said plurality of reporting devices based, at least in part, on:
(1) a make or model of said reporting mobile devices; (2) a barometric sensor capability of said reporting mobile devices a measurement obtained from an inertial sensor of reporting mobile devices; (3) a confidence level indicator corresponding to a reported barometric pressure measurement and/or said altitude measurement for said reporting mobile devices; (4) an age indicator corresponding to said reported barometric pressure measurement and/or said altitude measurement for said reporting mobile devices; or (5) any combination of (1) through (4).

12. The electronic device as recited in claim 7, and wherein said characteristic of said target mobile device is indicative of: a position fix parameter for an estimated location; a service or subscription feature corresponding to said target mobile device; or any combination thereof.

13. A method comprising, at a mobile device:

obtaining an expected barometric pressure measurement that is indicative, at least in part, of a reference altitude within a particular region of a particular environment, said expected barometric pressure measurement having been determined based, at least in part, on an altitude measurement for a barometric sensor in at least one reporting mobile device of a subset of reporting mobile devices, said subset of reporting mobile devices having been selected from a plurality of reporting mobile devices within said particular environment based, at least in part, on a characteristic of said target mobile device, wherein said characteristic of said target mobile device comprises a barometric sensor capability of said target mobile device, a make of said target mobile device or a model of said target mobile device, or a combination thereof, and wherein the altitude measurement is one a plurality of altitude measurements corresponding to reported barometric pressure measurements received in electronic messages transmitted over one or more wireless communication links from the plurality of reporting mobile devices;

estimating an altitude of said target mobile device based, at least in part, on said expected barometric pressure measurement that is indicative, at least in part of said reference altitude; and associating a position with said mobile device based, at least in part, on said estimated altitude.

14. The method as recited in claim 13, further comprising, at said at least one reporting mobile device:

determining a local barometric pressure based, at least in part, on a local barometric pressure measurement, and wherein estimating said altitude of at least one reporting mobile device comprises estimating said altitude of said at least one reporting mobile device based, at least in part, on said local barometric pressure measurement.

15. The method as recited in claim 13, wherein a structure comprises a plurality of levels having different altitudes and the method further comprising, at said least one reporting mobile device: selecting a mode of transition from one of said plurality of levels to another one of plurality of levels based, at least in part, on said estimated altitude.

16. The method as recited in claim 13, and further comprising, at said reporting mobile device: transmitting a request for said expected barometric pressure that is indicative, at least in part, of said reference altitude to an electronic device.

17. The method as recited in claim 13, wherein said characteristic of said target mobile device is indicative of: a position fix parameter for an estimated location; a service or subscription feature corresponding to said target mobile device; or some combination thereof.

18. The method as recited in claim 13, and wherein said selecting of said subset of reporting mobile devices from said plurality of reporting mobile devices within said particular environment based, at least in part, on (1) a make or model of said reporting mobile devices; (2) a barometric sensor capability of said reporting mobile devices a measurement obtained from an inertial sensor of said reporting mobile devices; (3) a confidence level indicator corresponding to a reported barometric pressure measurement and/or said altitude measurement for said reporting mobile devices; (4) an age indicator corresponding to said reported barometric pressure measurement and/or said altitude measurement for said reporting mobile devices; or (5) some combination of (1) through (4).

19. A mobile device comprising:

a communication interface capable of sending electronic messages to and receiving electronic messages from various electronic devices; and a processing unit coupled to said communication interface and configured to:

obtain, via said communication interface, an expected barometric pressure measurement that is indicative, at least in part, of a reference altitude within a particular region of a particular environment, said expected barometric pressure measurement having been determined based, at least in part, on an altitude measurement for a barometric sensor in at least one reporting mobile device of a subset of reporting mobile devices, said subset of reporting mobile devices having been selected from a plurality of reporting mobile devices within said particular environment based, at least in part, on a characteristic of said target mobile device, wherein said characteristic of said target mobile device comprises a barometric sensor capability of said target mobile device, a make of said target mobile device or a model of said target mobile device, or a combination thereof, wherein an estimated location of said at least one reporting mobile device is within said particular region, and wherein the altitude measurement is one a plurality of altitude measurements corresponding to reported barometric pressure measurements for said reference altitude received in electronic messages transmitted over one or more wireless communication links from the plurality of reporting mobile devices;

estimate an altitude of said target mobile device based, at least in part, on said expected barometric pressure that is indicative, at least in part of said reference altitude and associate a position with said target mobile device based, at least in part, on said estimated altitude.

20. The mobile device as recited in claim 19, wherein said processing unit is further configured to estimate said altitude further based, at least in part, on a local barometric pressure.

21. The mobile device as recited in claim 19, wherein a structure comprises a plurality of levels having different altitudes, and wherein said processing unit is further configured to select a mode of transition from one of said plurality of levels to another one of plurality of levels based, at least in part, on said estimated altitude.

22. The mobile device as recited in claim 19, and wherein said processing unit is further configured to initiate transmission of a request for said expected barometric pressure measurement that is indicative, at least in part of said reference altitude to an electronic device via said communication interface.

23. The mobile device as recited in claim 19, and wherein said processing unit is further configured to determine a position fix parameter for said estimated location.

24. The mobile device as recited in claim 19, wherein said characteristic of said target mobile device is indicative of: a position fix parameter for said estimated location; a service or subscription feature corresponding to said target mobile device; or some combination thereof.

25. The mobile device as recited in claim 19, and wherein said selecting said subset of reporting mobile devices from said plurality of reporting mobile devices within said particular environment based, at least in part, on (1) a make or model of said reporting mobile devices; (2) a barometric sensor capability of said reporting mobile devices a measurement obtained from an inertial sensor of said reporting mobile devices; (3) a confidence level indicator corresponding to a reported barometric pressure measurement and/or said altitude measurement for said reporting mobile devices; (4) an age indicator corresponding to said reported barometric pressure measurement and/or said altitude measurement for said reporting mobile devices; or (5) some combination of (1) through (4).

* * * * *